(12) United States Patent
Burckart et al.

(10) Patent No.: US 8,771,077 B2
(45) Date of Patent: Jul. 8, 2014

(54) SYSTEM, METHOD, AND APPARATUS FOR ASSOCIATING A GAMING PROFILE USING PROXIMITY OF A WIRELESS DEVICE

(75) Inventors: Erik J Burckart, Raleigh, NC (US); Steve R. Campbell, Lillington, NC (US); Andrew J. Ivory, Wake Forest, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1272 days.

(21) Appl. No.: 12/169,469

(22) Filed: Jul. 8, 2008

(65) Prior Publication Data

US 2010/0009755 A1 Jan. 14, 2010

(51) Int. Cl.
*A63F 9/24* (2006.01)
*A63F 13/12* (2006.01)

(52) U.S. Cl.
CPC .......... *A63F 13/12* (2013.01); *A63F 2300/406* (2013.01); *A63F 2300/5573* (2013.01)
USPC .................................. 463/42; 463/40; 463/43

(58) Field of Classification Search
CPC .............. A63F 13/12; A63F 2300/406; A63F 2300/5573
USPC .................................................. 463/40, 42, 43
See application file for complete search history.

(56) References Cited

U.S. PATENT DOCUMENTS

| 7,828,654 | B2* | 11/2010 | Carter, Sr. ................. | 463/29 |
|---|---|---|---|---|
| 2007/0117623 | A1* | 5/2007 | Nelson et al. ................. | 463/29 |
| 2008/0039203 | A1* | 2/2008 | Ackley et al. ................. | 463/40 |
| 2008/0268931 | A1* | 10/2008 | Alderucci et al. .............. | 463/11 |
| 2009/0036188 | A1* | 2/2009 | Gelman ................. | 463/16 |
| 2009/0098940 | A1* | 4/2009 | Sangberg ................. | 463/42 |
| 2010/0105482 | A1* | 4/2010 | Pacey et al. ................. | 463/42 |

* cited by examiner

*Primary Examiner* — Michael Cuff
(74) *Attorney, Agent, or Firm* — Jeffrey T. Holman (57) ABSTRACT

An apparatus, system, and method for associating a gaming profile based on a position of a wireless device relative to a gaming controller. The system includes a position detector to detect a position of each of a plurality of gaming controllers. The position detector also detects a position of the mobile phone relative to each of the plurality of gaming controllers. The gaming profile is associated with the mobile phone. The system also includes a gaming profile manager to associate the gaming profile with one of the gaming controllers in response to the position of the wireless device relative to each of the plurality of gaming controllers.

16 Claims, 10 Drawing Sheets

SYSTEM, METHOD, AND APPARATUS FOR ASSOCIATING A GAMING PROFILE USING PROXIMITY OF A WIRELESS DEVICE

BACKGROUND

In today's gaming environment the idea of gaming profiles is becoming common as a way to store saved games, statistics, social networking information, and so forth. Typically, these gaming profiles are stored on a gaming system hard drive, a memory card, or a game server.

To play a game, a user typically picks a gaming controller connected to the gaming system from several available gaming controllers. Next, the user typically selects his or her gaming profile from an arbitrarily sorted list for association with the gaming controller. The user may then play the game using the gaming profile. Over time, the gaming console may build up a large number of gaming profiles, and the already time consuming process of selecting a gaming profile from an arbitrarily sorted list may become even more time consuming.

SUMMARY

Embodiments of a system are described. In one embodiment, the system operates to select a gaming profile based on a position of a mobile phone. In certain embodiments, the system includes a position detector and a gaming profile manager. The position detector detects a position of each of a plurality of gaming controllers. The position detector also detects a position of the mobile phone relative to each of the plurality of gaming controllers. The gaming profile is associated with the mobile phone. The gaming profile manager associates the gaming profile with one of the gaming controllers in response to the position of the wireless device relative to each of the plurality of gaming controllers. Other embodiments of the system are also described.

Embodiments of a method are also described. In one embodiment, the method is a method for selecting a gaming profile based on a position of a wireless device relative to a gaming controller. One embodiment of the method includes communicating with the wireless device associated with the gaming profile of a gaming system. The wireless device is a device other than the gaming controller. The method also includes detecting a position of the wireless device relative to the gaming controller. The method also includes associating the gaming profile with one of the gaming controllers in response to the position of the wireless device relative to the gaming controller. Other embodiments of the method are also described.

Embodiments of an apparatus are also described. The apparatus, in one embodiment, is an apparatus for selecting a gaming profile based on a position of a wireless device relative to a gaming controller. In one embodiment, the apparatus includes a transceiver, a position detector, and a gaming profile manager. The transceiver communicates with a mobile phone and receives gaming profile data from the mobile phone. The mobile phone is associated with the gaming profile. The position detector detects a position of the mobile phone. The gaming profile manager associates the gaming profile with the gaming controller in response to the position of the mobile phone relative to the gaming controller. Other embodiments of the apparatus are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments synchronize a portable gaming profile with a gaming system. In general, many of the embodiments described involve associating a gaming profile with a wireless device. In some embodiments, the gaming profile is associated with a gaming controller based on the position of the wireless device.

Figure 1:
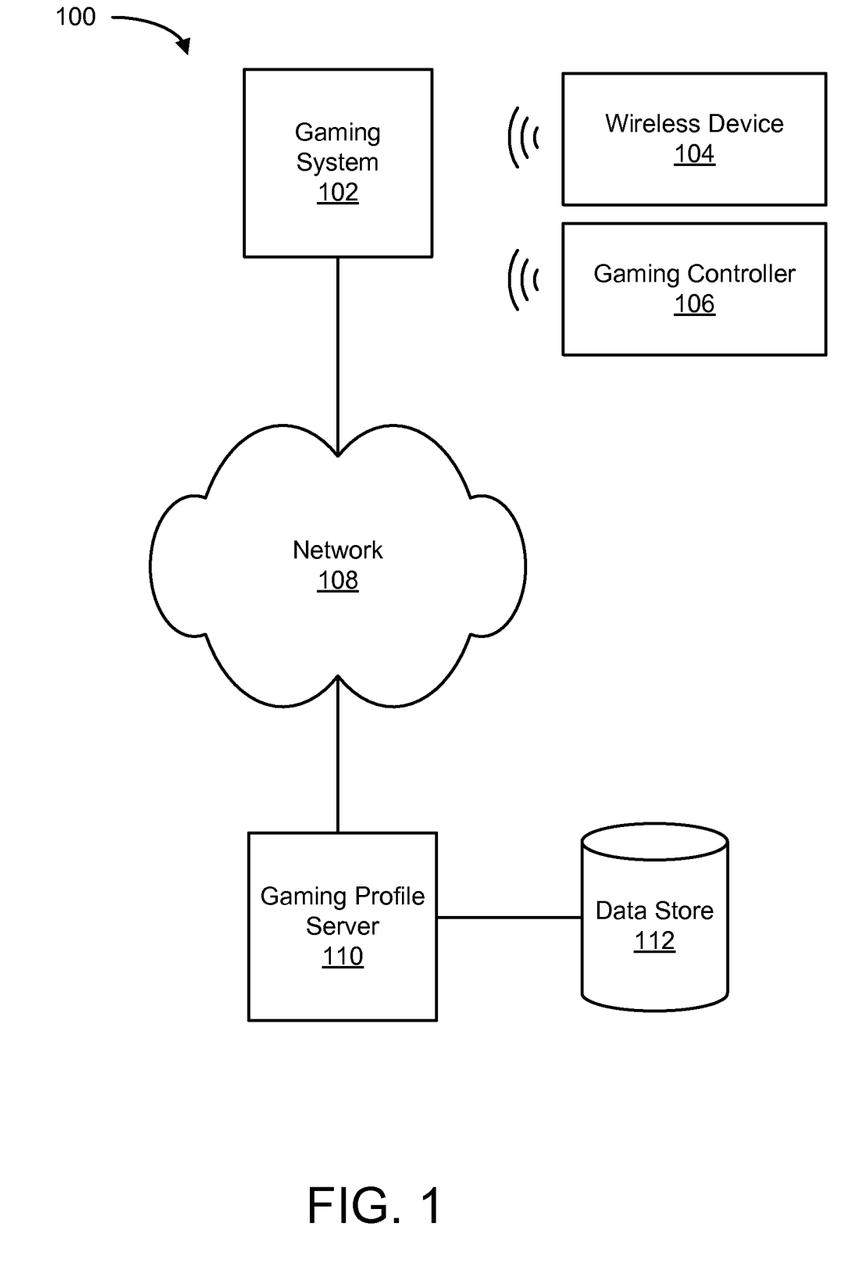
FIG. 1 depicts a schematic diagram of one embodiment of a system for using a portable gaming profile on a wireless device.

FIG. 1 depicts a schematic diagram of one embodiment of a system 100 for using a portable gaming profile on a wireless device 104. The system 100 includes a gaming system 102, a wireless device 104, and a gaming controller 106. In certain embodiments, the system 100 also includes a network 108, a gaming profile server 110, and a data store 112. The system 100 receives wireless communications, which include gaming profile data associated with a user of a gaming system 102 from the wireless device 104.

The gaming system 102, in one embodiment, provides a platform for playing video games. In certain embodiments, the gaming system 102 receives inputs from the gaming controller 106 to facilitate gameplay. The gaming system 102 may be a dedicated gaming console. In another embodiment, the gaming system 102 may be a general-purpose computer. Examples of gaming systems 102 include the Microsoft Xbox 360™, the Nintendo Wii™, and the Sony PlayStation 3™.

The wireless device 104, in one embodiment, communicates wirelessly with the gaming system 102 to provide gaming profile data. The gaming profile data is associated with a gaming profile on the gaming system 102. Communication with the wireless device 104 is indicative of the presence near the gaming system 102 of a user associated with the gaming profile.

In one embodiment, the gaming system 102 uses the received gaming profile data to create a gaming profile associated with the gaming profile data. In another embodiment, the gaming system 102 uses the received gaming profile data to update a gaming profile previously stored on the gaming system 102 associated with the gaming profile data. In another embodiment, the gaming system 102 allows a user to select an existing, unmodified gaming profile previously stored on the gaming system 102.

In a different embodiment, a gaming system 102 transmits gaming profile data to the wireless device 104. The transmitted gaming profile data may be stored on the wireless device 104. In certain embodiments, gaming profile data is updated on the wireless device 104.

The gaming system 102, in some embodiments, determines a position of the wireless device 104. The gaming system 102 may use this position to associate a gaming profile associated with the wireless device 104 with a gaming controller 106. For example, the gaming system 102 may have a plurality of associated gaming controllers 106. The gaming system 102 may determine which gaming controller 106 is closest to the wireless device 104 based on the position of the wireless device 104, and associate the wireless device 104 with the closest gaming controller 106.

In one embodiment, the gaming profile data received from the wireless device 104 is transmitted over the network 108 to a gaming profile server 110. The gaming profile server 110 may use the gaming profile data to retrieve a gaming profile from the data store 112. The gaming profile may then be transmitted over the network 108 to the gaming system 102.

For example, the wireless device 104 may include a key associated with a gaming profile stored on the data store 112. A user may bring the wireless device 104 into communication range with the gaming system 102. The key is received by the gaming system 102 and transmitted to the gaming profile server 110. The gaming profile server 110 queries the data store 112 and retrieves the associated gaming profile, which is then transmitted back to the gaming system 102. In this example, a user may easily retrieve a gaming profile stored on a central server, such as a server used with Xbox live™.

Figure 2:
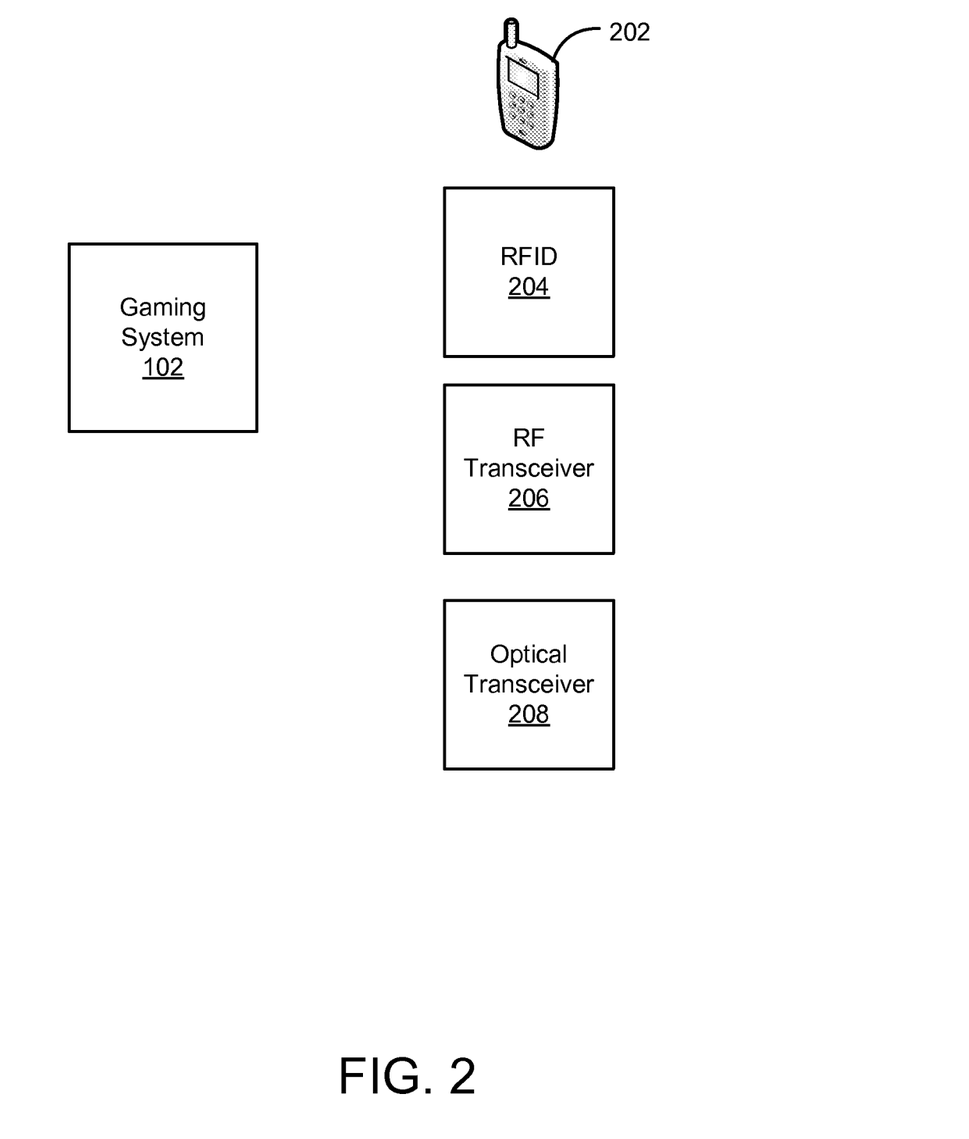
FIG. 2 depicts a schematic diagram of one embodiment of wireless devices for a portable gaming profile.

FIG. 2 depicts a schematic diagram of one embodiment of wireless devices 202, 204, 206, 208 for a portable gaming profile. Example wireless devices include a mobile phone 202, a radio frequency identification (RFID) 204, a radio frequency (RF) transceiver 206, and an optical transceiver 208. The wireless devices 202, 204, 206, 208 are capable of storing gaming profile data associated with a user. In certain embodiments, the wireless device 104 is a device other than a gaming controller.

In one embodiment, the wireless device 104 is a mobile telephone 202. The mobile telephone 202 may communicate with the gaming system 102 using any known method for communication. For example, the mobile phone 202 may communicate with the gaming system 102 using a Bluetooth protocol. Other examples of communication methods that may be used by a mobile phone 202 to communicate with the gaming system 102 include but are not limited to Wi-Fi and an infrared protocol such as IrDA. One benefit of using a mobile phone 202 as a wireless device 104 is that users frequently carry mobile phones, and many phones include the capability to communicate wirelessly with the gaming system 102.

In another embodiment, the wireless device 104 is an RFID 204. The RFID 204 provides a low-cost way to transport and deliver gaming profile data to a gaming system 102. For example, the RFID 204 may be embedded in a gaming profile card (not shown) carried by the user. The gaming profile card may have the form factor of a credit card. In one embodiment, the RFID 204 may transmit a key associated with the gaming profile of the user. The key in this example may be used to access a gaming profile on a gaming system 102 or from a remote gaming profile server 110.

The wireless device 104, in some embodiments, may communicate with the gaming system 102 using an RF transceiver 206. The RF transceiver 206 may be any type of known transceiver that operates using radio frequency. Examples of RF transceivers 206 include but are not limited to a Bluetooth transceiver, a Wi-Fi transceiver, and a wireless USB transceiver.

In another embodiment, the wireless device 104 communicates with the gaming system 102 using an optical transceiver 208. The optical transceiver 208 may be any type of known transceiver that operates optically. An example of an optical transceiver 208 is an infrared transceiver operating using an IrDA protocol.

Figure 3:
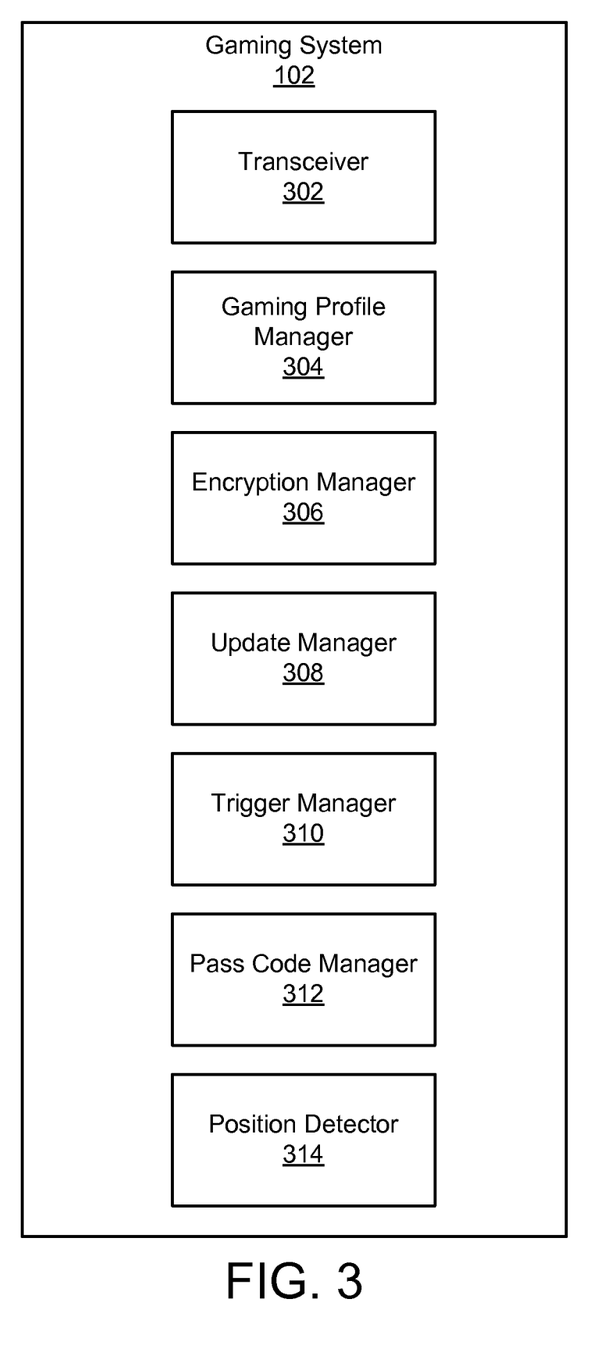
FIG. 3 depicts a schematic diagram of one embodiment of the gaming system of FIG. 1.

FIG. 3 depicts a schematic diagram of one embodiment of the gaming system 102 of FIG. 1. The illustrated gaming system 102 includes a transceiver 302, a gaming profile manager 304, an encryption manager 306, an update manager 308, a trigger manager 310, a pass code manager 312, and a position detector 314. The gaming system 102 interacts with the wireless device 104.

The transceiver 302, in one embodiment, communicates with the wireless device 104. In one embodiment, the transceiver 302 receives gaming profile data from the wireless device 104. In another embodiment, the transceiver 302 transmits gaming profile data to the wireless device 104. In certain embodiments, the transceiver 302 receives a signal from the wireless device 104 to determine a position of the wireless device 104.

Any known type of device for transmitting or receiving a signal may be used as a transceiver 302. For example, the transceiver 302 may be a radio frequency transceiver, such as a Bluetooth transceiver. In another example, the transceiver 302 is an optical transceiver, such as an infrared transceiver.

The gaming profile manager 304, in one embodiment, manages a gaming profile for association with the wireless device 104. In one embodiment, the gaming profile manager 304 receives gaming profile data from the wireless device 104 and associates the gaming profile data with a gaming profile stored on the gaming system 102. For example, the gaming profile manager 304 may receive a username, user settings, and game settings from the wireless device 104. The username, user settings, and game settings may be used to create or update a gaming profile on the gaming system 102.

In another embodiment, the gaming profile manager 304 transmits gaming profile data to the wireless device 104. For example, the gaming profile manager 304 may direct the transceiver 302 to transmit a game save to the wireless device 104.

The gaming profile manager 304, in certain embodiments, associates a gaming profile with a gaming controller 106. For example, the gaming profile manager 304 may assign the use of a gaming profile to a particular gaming controller 106. In some embodiments, the gaming profile manager 304 associates a gaming profile to a gaming controller 106 in response to a position of the gaming controller 106 relative to each wireless device 104. The position of the gaming controller 106 may be detected by the position detector 314 as described below.

The encryption manager 306, in one embodiment, encrypts data communicated between the gaming system 102 and the wireless device 104. The encryption manager 306 may decrypt data received from the wireless device 104. The encryption manager 306 may use any known type of encryption, including but not limited to a public key cryptography method.

In one embodiment, the update manager 308 causes the gaming system 102 to transmit updated gaming profile data to the wireless device 104. The update manager 308, in certain embodiments, responds to a trigger that causes the update manager 308 to initiate an update. The trigger, in some embodiments, is an input from the user. For example, the user may explicitly request that the wireless device 104 be updated, triggering the update manager 308 to initiate an update.

In another embodiment, the trigger may be an in-game event. For example, upon completing a predetermined portion of a game, a game may trigger an automatic update, causing the trigger manager 310 to update the wireless device 104. In still another embodiment, the trigger may be a passage of a period of time since the most recent update. For example, the trigger manager 310 may initiate an update of the wireless device 104 every 15 minutes.

The pass code manager 312, in one embodiment, manages a pass code allowing access to the gaming profile data. In some embodiments, a pass code is entered on the gaming system 102 before gaming profile data is associated with a gaming profile. For example, the gaming system 102 may present an input screen to a user indicating that a pass code is required to access gaming profile data stored on a wireless device 104. In response to receipt of the proper pass code, the gaming system 102 associates the gaming profile data with a gaming profile.

In another embodiment, the pass code manager 312 limits the transmission of gaming profile data. For example, the pass code manager 312 may require the input of a proper pass code before gaming profile data is transmitted from the wireless device 104 to the gaming system 102. In yet another embodiment, the pass code manager 312 may limit access to the wireless device 104. For example, the pass code manager 312 may require the input of a proper pass code before gaming profile data is transmitted to the wireless device 104.

The position detector 314, in one embodiment, detects a position of the wireless device 104. The gaming system 102 may use the position of the wireless device to determine a potential association of a gaming profile with elements of the gaming system 102, such as the wireless controllers 106 and view panes.

The position of a wireless device 104 is detected by the position detector 314, in some embodiments, by reading a signal strength of a signal transmitted by the wireless device 104. In one embodiment, the position detector 314 reads a signal strength for each of multiple signals transmitted by a plurality of wireless devices 104. In this embodiment, the position detector 314 may compare the signal strengths for each of the plurality of wireless devices 104 to determine a position for each of the plurality wireless devices 104.

In one embodiment, the position detector 314 receives a signal transmitted by the wireless device 104 to the gaming system 102. In another embodiment, the position detector 314 receives a signal transmitted by the wireless device 104 to a gaming controller 106. In a further embodiment, the position detector 314 detects the position of the wireless device 104 relative to the gaming controller 106 by measuring a signal strength of a signal received at the gaming controller 106.

For example, a gaming controller 106 may include a receiver that receives a signal from each of a plurality of wireless devices. The position detector 314 may measure each of the signals received from each of the plurality of wireless devices at the gaming controller 106. The position detector 314 may determine that the closest of the plurality of wireless devices 104 to the gaming controller 106 is the wireless device 104 having the highest signal strength at the gaming controller 106.

In some embodiments, the position detector 314 uses a plurality of sensors (not shown) to detect a position of the wireless device 104. Each of the plurality of sensors may be separated by a distance, and signals received from the wireless device 104 at a plurality of sensors may be compared to infer a position of the wireless device 104. In one embodiment, two sensors capable of determining a direction to a wireless device 104 triangulate a position for the wireless device 104. In another embodiment, three sensors capable of determining a signal strength of a signal received from a wireless device 104 infer a position of the wireless device 104.

In an alternate embodiment, the position detector 314 determines the position of the wireless device 106 by receiving an absolute location from a global navigation satellite system fix, such as a global positioning system (GPS) fix. For example, the wireless device 106 may be a mobile telephone 202 that includes a GPS receiver. The mobile telephone 202 may determine coordinates that indicate the absolute position of the mobile telephone 202 from the GPS receiver and transmit the absolute position of the mobile telephone 202 to the position detector 314.

In some embodiments, the position detector 314 detects a position of a gaming controller 106. The position detector 314 may detect the position of the gaming controller 106 using any known method for detecting position, including but not limited to the methods described above for determining a position of a wireless device 104. The gaming system 102, in certain embodiments, compares the position of the gaming controller 106 to the position of the wireless device 104 to determine a relative position of the gaming controller 106 to the wireless device 104.

In another embodiment, the wireless device 104 receives a signal from a gaming controller 106. In certain embodiments, the wireless device 104 receives a signal from a plurality of gaming controllers 106. The wireless device 104, in one embodiment, measures a signal strength of the signal received from each of the plurality of gaming controllers 106 and passes the signal strengths to the position detector 314. The position detector 314, in one embodiment, compares the signal strengths received at the wireless device 104 to determine which gaming controller 106 of the plurality of gaming controllers 106 is closest to the wireless device 104.

In one embodiment, the gaming system 102 uses the position of a wireless device 104 to determine a gaming profile to associate with the gaming controller 106. For example, a gaming profile may be associated with gaming profile data on a wireless device 104 that is determined to be closest to a gaming controller 106. In this example, the gaming profile is associated with the gaming controller 106.

In another embodiment, the gaming system 102 uses the position of the wireless device 104 to order a list of gaming profiles for association with a gaming controller 106. For example, the position detector 314 may determine positions of each of a plurality of wireless devices 104 relative to a gaming controller 106. The gaming system 102 may generate a list of gaming profiles, each gaming profile associated with one of the plurality of wireless devices 104. The list of gaming profiles may be ordered by proximity of the associated wireless device to the gaming controller 106. In some embodiments, the gaming system 102 receives input from a user selecting a gaming profile from the ordered list of gaming profiles.

Figure 4:
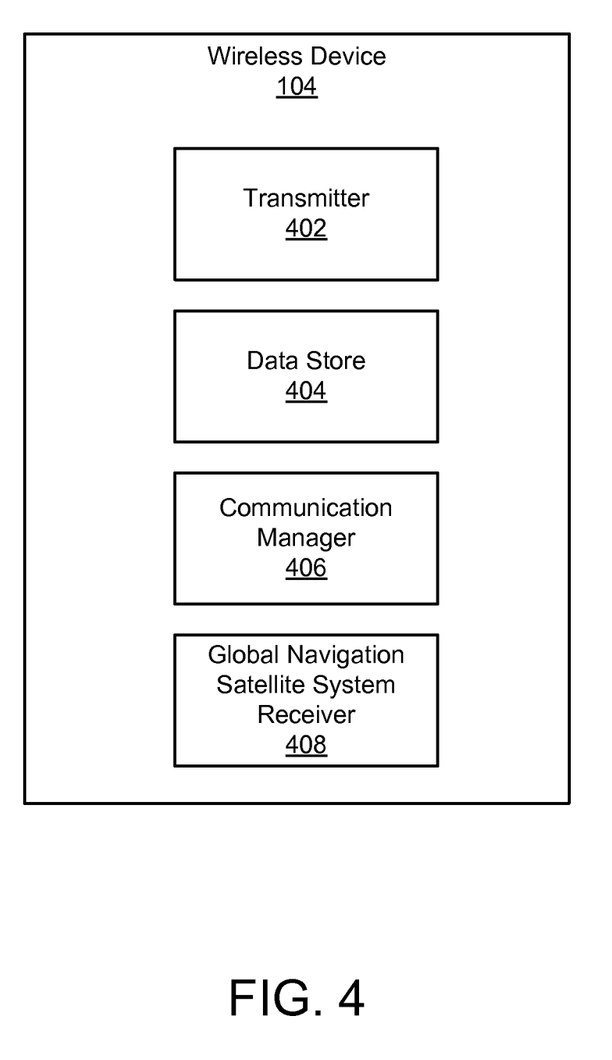
FIG. 4 depicts a schematic diagram of one embodiment of the wireless device of FIG. 1.

FIG. 4 depicts a schematic diagram of one embodiment of the wireless device 104 of FIG. 1. In the illustrated embodiment, the wireless device 104 includes a transmitter 402, a data store 404, a communication manager 406, and a global navigation satellite system receiver 408. The wireless device 104 stores and transmits gaming profile data to the gaming system 102.

The transmitter 402 transmits gaming profile data to the gaming system 102. The transmitter 402 may be any type of known transmitter such as an RF transmitter, and infrared transmitter, or another transmitter. One specific example of a transmitter 402 in a wireless device 104 is a Bluetooth transmitter in a mobile phone 202.

The data store 404, in one embodiment, stores gaming profile data. The data store 404 may be a known type of data store, such as a flash memory, a read only memory (ROM), a random access memory (RAM), or another type of data store. In certain embodiments, the contents of the data store 404 may be modified. For example, the wireless device 104 may receive gaming profile data, such as a username or a game save, from the gaming system 102 and modify the data store 404 to include the received gaming profile data.

In another embodiment, the contents of the data store 404 may not be modified. For example, the data store 404 may include a key associated with a gaming profile. That key may be permanently associated with the wireless device 104, and the key may further constitute gaming profile data that identifies a gaming profile with which the wireless device 104 is to be associated. In this example, the key is transmitted by the transmitter 402 of the wireless device 104 to the gaming system 102. The gaming system 102 may use this key to determine a gaming profile associated with the wireless device 104, and present the associated gaming profile for selection, associate the associated gaming profile with a gaming controller 106, or perform other actions with the associated gaming profile.

The communication manager 406, in one embodiment, manages communication between the wireless device 104 and the gaming system 102. The communication manager 406 may restrict the transmission of gaming profile data to a gaming system 102. For example, the wireless device 104 may receive a request from a gaming system 102 for a transmission of gaming profile data. The communication manager 406, in this example, may require an input from a user on the wireless device 104 before transmitting gaming profile data.

In another embodiment, the communication manager 406 restricts reception of gaming profile data from a gaming system 102. For example, a gaming system 102 may transmit gaming profile data to the wireless device 104. The communication manager 406, in this example, may request an input from a user before overwriting gaming profile data in the data store 404.

In some embodiments, the wireless device 104 includes a global navigation satellite system receiver 408. The global navigation satellite system receiver 408 receives a signal from a satellite system to determine an absolute position of the wireless device 104. In some embodiments, the wireless device 104 transmits data relating to the position of the wireless device 104 to the gaming system 102. For example, the global navigation satellite system receiver 408 may be a GPS receiver, and the GPS receiver may determine a longitude and latitude for the wireless device 104. The determined longitude and latitude may be transmitted to the gaming system 102.

Figure 5:
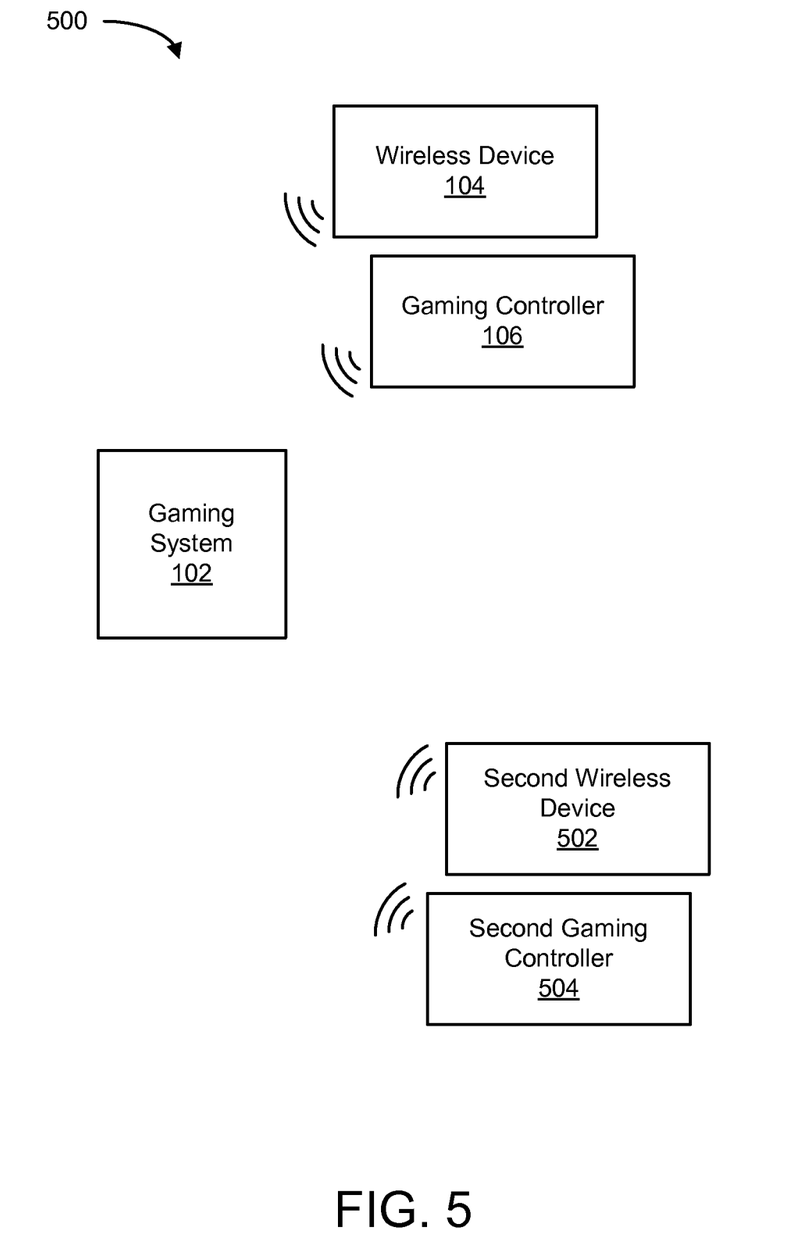
FIG. 5 depicts a schematic diagram of one embodiment of a system for associating a gaming profile with a gaming controller based on a position of a wireless device.

FIG. 5 depicts a schematic diagram of one embodiment of a system 500 for associating a gaming profile with a gaming controller 106 based on a position of a wireless device 104. The system 500 includes a gaming system 102, a wireless device 104, a gaming controller 106, a second wireless device 502, and a second gaming controller 504. The illustrated system 500 associates a gaming profile associated with the wireless device 104 with the gaming controller 106.

In one embodiment, the gaming system 102 determines the position of a wireless device 104 relative to a plurality of gaming controllers 106, 504 to determine which gaming controller 106, 504 is closest to the wireless device 104. In this embodiment, a gaming profile is associated with the wireless device 104, and the gaming system 102 associates the gaming profile with the gaming controller 106 that is closest to the wireless device 104. By way of example, in FIG. 5, the gaming controller 106 is closest to the wireless device 104, and the second wireless device 502 is closest to the second gaming controller 504. In this example, the gaming profile associated with the wireless device 104 may be associated with the gaming controller 106. Additionally, the gaming profile associated with the second wireless device 502 may be associated with the second gaming controller 504.

In another embodiment, the gaming system 102 determines a position of each of a plurality of wireless devices 104, 502 relative to a gaming controller 106. In certain embodiments, the gaming system 102 presents a list of gaming profiles for selection to the user based on the relative position of one or more wireless devices 104, 502 to the gaming controller 106. For example, in FIG. 5, the wireless device 104 is closest to the gaming controller 106, and the second wireless device 502 is next closest to the gaming controller 106. In this example, the gaming system 102 may present a list of gaming profiles for selection to the user. In one embodiment, the gaming profile associated with the wireless device 104 closest to the gaming controller 106 appears in the list before the gaming profile associated with the second wireless device 502 closest to the second gaming controller 504.

Figure 6:
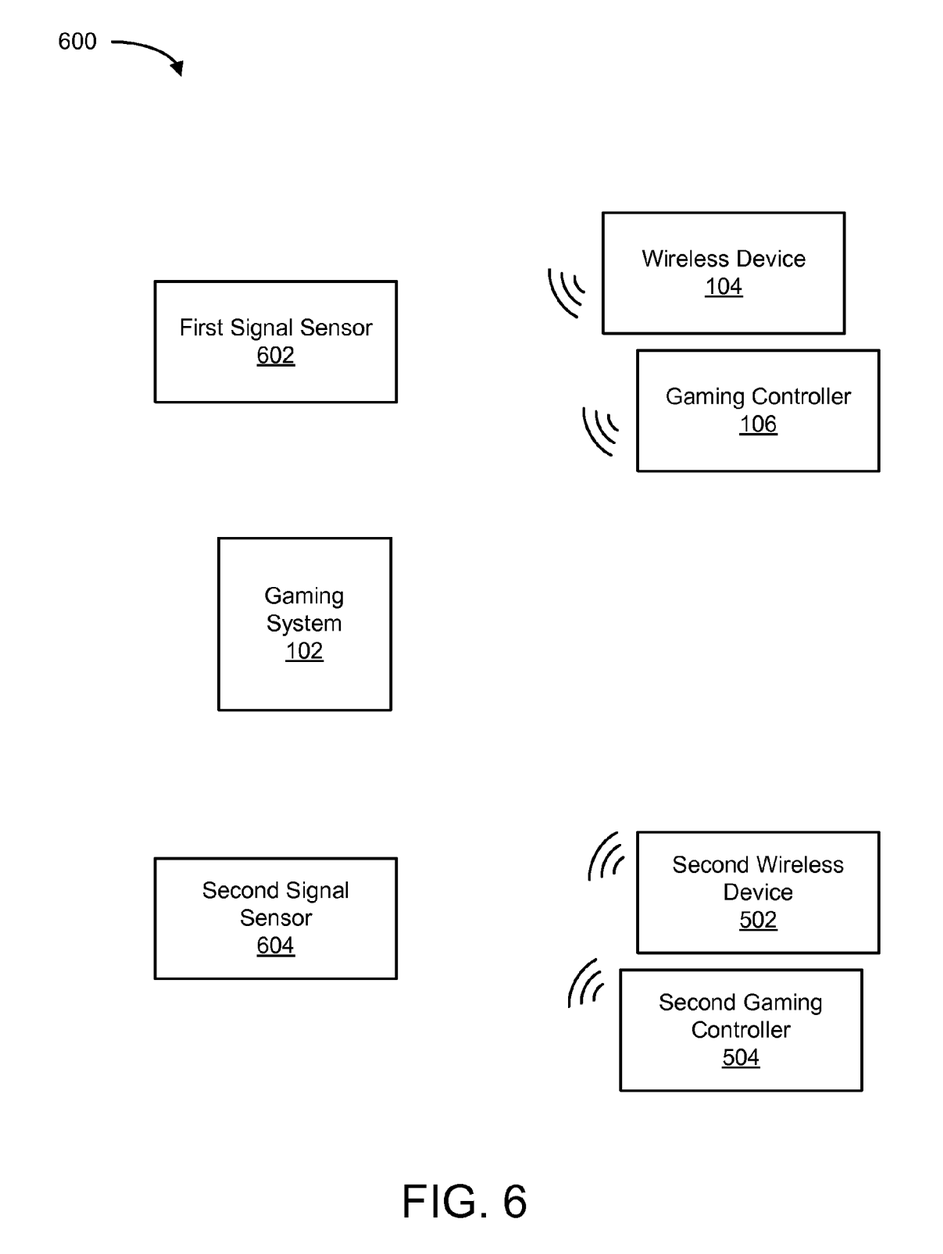
FIG. 6 depicts a schematic diagram of another embodiment of a system for associating a gaming profile with a gaming controller based on a position of a wireless device.

FIG. 6 depicts a schematic diagram of another embodiment of a system 600 for associating a gaming profile with a gaming controller 106, 504 based on a position of a wireless device 104. The illustrated system 600 includes a gaming system 102, a wireless device 104, a gaming controller 106, a second wireless device 502, a second gaming controller 504, a first signal sensor 602, and a second signal sensor 604. The system 600 associates a gaming profile associated with the wireless device 104 with the gaming controller 106.

In one embodiment, the gaming system 102 determines a position of the wireless device 104 relative to a plurality of gaming controllers 106, 504 to determine which gaming controller 106, 504 is closest to the wireless device 104. In this embodiment, a gaming profile is associated with the wireless device 104, and the gaming system 102 associates the gaming profile with the gaming controller 106 that is closest to the wireless device 104.

In one embodiment, a signal from the wireless device 104 is detected by the first signal sensor 602 and the second signal sensor 604. The first signal sensor 602 and the second signal sensor 604 are separated by a distance. The separation of the two signal sensors 602, 604 allows the signal sensors 602, 604 to triangulate a position of the wireless device 104 based on differences in the received signals.

In one embodiment, the signal sensors 602, 604 each detect a direction from which the signal emanates. By calculating an intersection of the directions from each signal sensor 602, 604, the gaming system 102 infers a position for the wireless device 104.

In an alternate embodiment, the signal sensors 602, 604 each detect a signal strength for the received signal. By comparing the received signal strengths, the gaming system 102 is able to infer a position for the wireless device 104. In a further embodiment, the system 600 includes a third signal sensor (not shown) which receives a signal from the wireless device 104 and measures a signal strength of the signal. In some embodiments, the gaming system 102 includes the signal strength from the third signal sensor to infer a likely position for the wireless device 104.

In some embodiments, the signal sensors 602, 604 detect a signal from the gaming controller 106. In one embodiment, the gaming system 102 uses the methods described above in relation to determining the position of the wireless device 104 to determine a position of the gaming controller 106.

The gaming system 102, in one embodiment, uses the methods described above to detect a position of each of a plurality of wireless devices 104, 502 and/or a position of each of a plurality of gaming controllers 106, 504. In certain embodiments, the gaming system 102 uses this position information to associate the wireless devices 104, 502 with the gaming controllers 106, 504 based on position.

Figure 7:
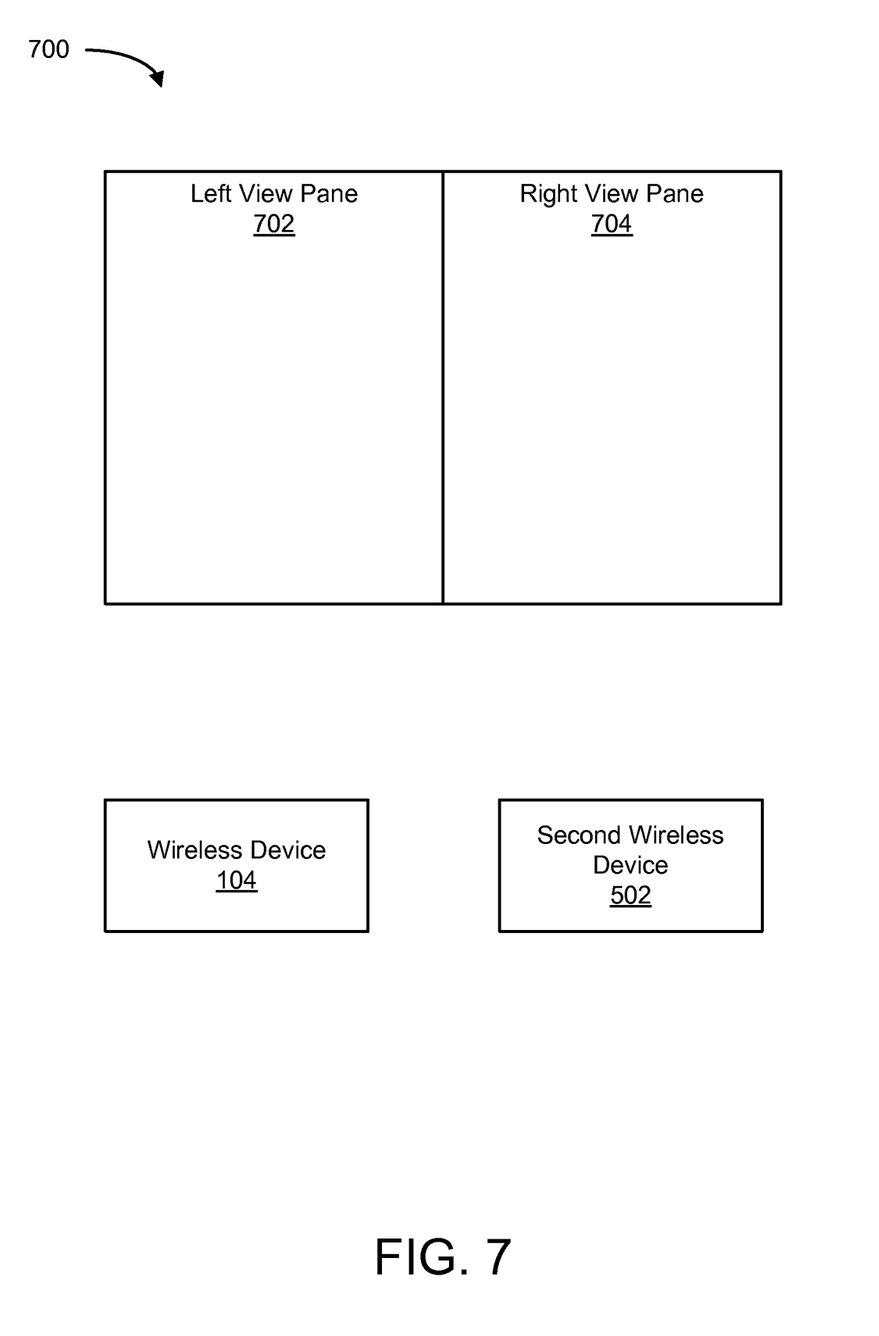
FIG. 7 depicts a schematic diagram of one embodiment of a system for associating a gaming profile with a view pane based on a position of the wireless device.

FIG. 7 depicts a schematic diagram of one embodiment of a system 700 for associating a gaming profile with a view pane based on a position of the wireless device 104. In certain games, a display device is divided into a plurality of view panes 702, 704, and each view pane 702, 704 corresponds to an individual user. Each view pane 702, 704 corresponds to a physical, subdivided area of the display device. The system 700, in certain embodiments, includes a left view pane 702, a right view pane 704, a wireless device 104, and a second wireless device 504. The system 700 determines the position of the wireless device 104 and determines a view pane to associate with the gaming controller 106 associated with the wireless device 104.

In one embodiment, the system 700 infers the position of a user operating a gaming controller 106 by determining the position of the wireless device 104 associated with that user. In certain circumstances, multiple users are arranged in positions relative to the display, and it may be useful if the view pane assigned to each user is in a position close to where the user is positioned. For example, in the illustrated embodiment, the wireless device 104 is positioned on the left side of the display, and therefore would ideally be assigned to left view pane 702.

Given the position of the wireless device 104 and the association of that wireless device 104 with a gaming profile, the system 700, in one embodiment, assigns a gaming profile to a view pane based on the position of wireless device 104. In certain embodiments, the system 700 presents a list of available view panes for assignment to the user. The list may be sorted according to the position of one or more wireless devices 104, 502.

Figure 8:
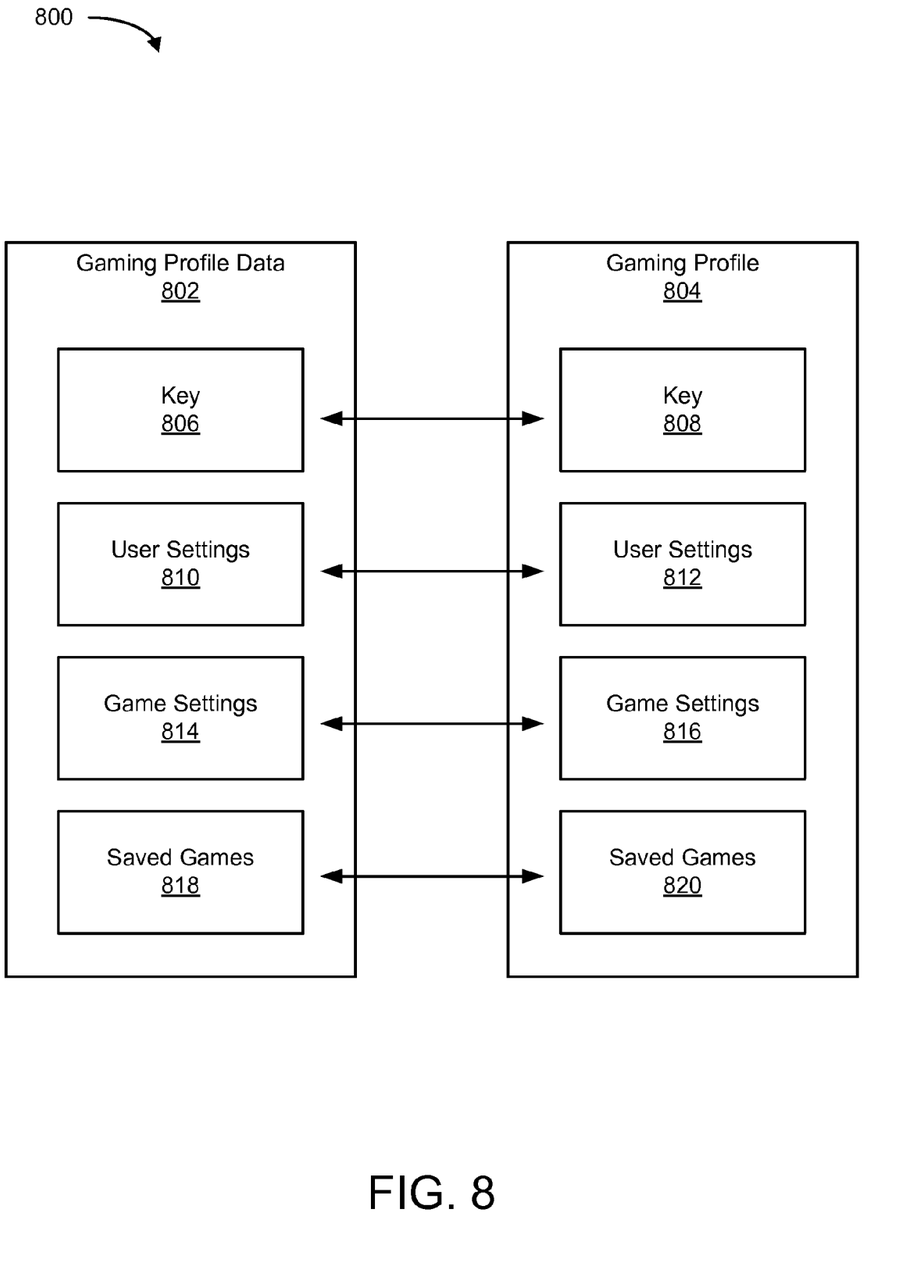
FIG. 8 depicts a schematic diagram of one embodiment of a correlation between gaming profile data and a gaming profile.

FIG. 8 depicts a schematic diagram of one embodiment of a correlation between gaming profile data 802 and a gaming profile 804. The gaming profile data 802, in certain embodiments, is stored on the wireless device 102, and the gaming profile 804 operates on the gaming system 102. One or more elements of the gaming profile data 802 correspond to one or more elements of the gaming profile 804.

In one embodiment, one or more elements of the gaming profile data 802 are transmitted to the gaming system 102 for correlation with the gaming profile 804. The gaming profile data 802 may be used to identify a gaming profile 804 for association with the wireless device 102. In another embodiment, the gaming profile data 802 may be used to create and/or update the gaming profile 804 on the gaming system 102.

In an alternative embodiment, one more elements of the gaming profile 804 are transmitted to the wireless device 104 to create and/or update the gaming profile data 802 on the wireless device 104. In this manner, gaming profile data 802 may be stored on the wireless device 104 for portable use at another gaming system 102.

In one embodiment, the gaming profile data 802 includes a key 806. The key 806, in certain embodiments, is an identifier that identifies a gaming profile associated with the key 806. The key 806 may be used to identify a gaming profile 804 associated with the wireless device 104. The associated gaming profile 804 may be stored on the gaming system 102, on a gaming profile server 110, or on the wireless device 104. The key 806 on the wireless device 102 may correspond to a key 808 in the gaming profile 804.

The gaming profile data 802 includes user settings 810, in certain embodiments. The user settings 810 include settings relating to the user associated with the wireless device 104. For example, a user name may be a user setting 810. In one embodiment, the user settings 810 in the gaming profile data 802 correspond to the user settings 812 in the gaming profile 804. In certain embodiments, the user settings 810 on the wireless device 104 include a subset of the user settings 812 in the gaming profile 804.

The gaming profile data 802, in one embodiment, includes game settings 814. The game settings 814 include settings for the user corresponding to a particular game. For example, game settings 814 may include a gaming controller configuration for a game. The game settings 814 of the gaming profile data 802 correspond to game settings 816 of the gaming profile 804. In certain embodiments, the game settings 814 of the gaming profile data 802 comprise a subset of the game settings 816 of the gaming profile 804.

The saved games 818 of the gaming profile data 802, in one embodiment, include one or more saved games that allow the user to return to a game in a previously saved condition. The saved games 818 of the gaming profile data 802 correspond to the saved games 820 of the gaming profile 804. In certain embodiments, the saved games 818 of the gaming profile data 802 include a subset of the saved games 820 of the gaming profile 804.

Figure 9:
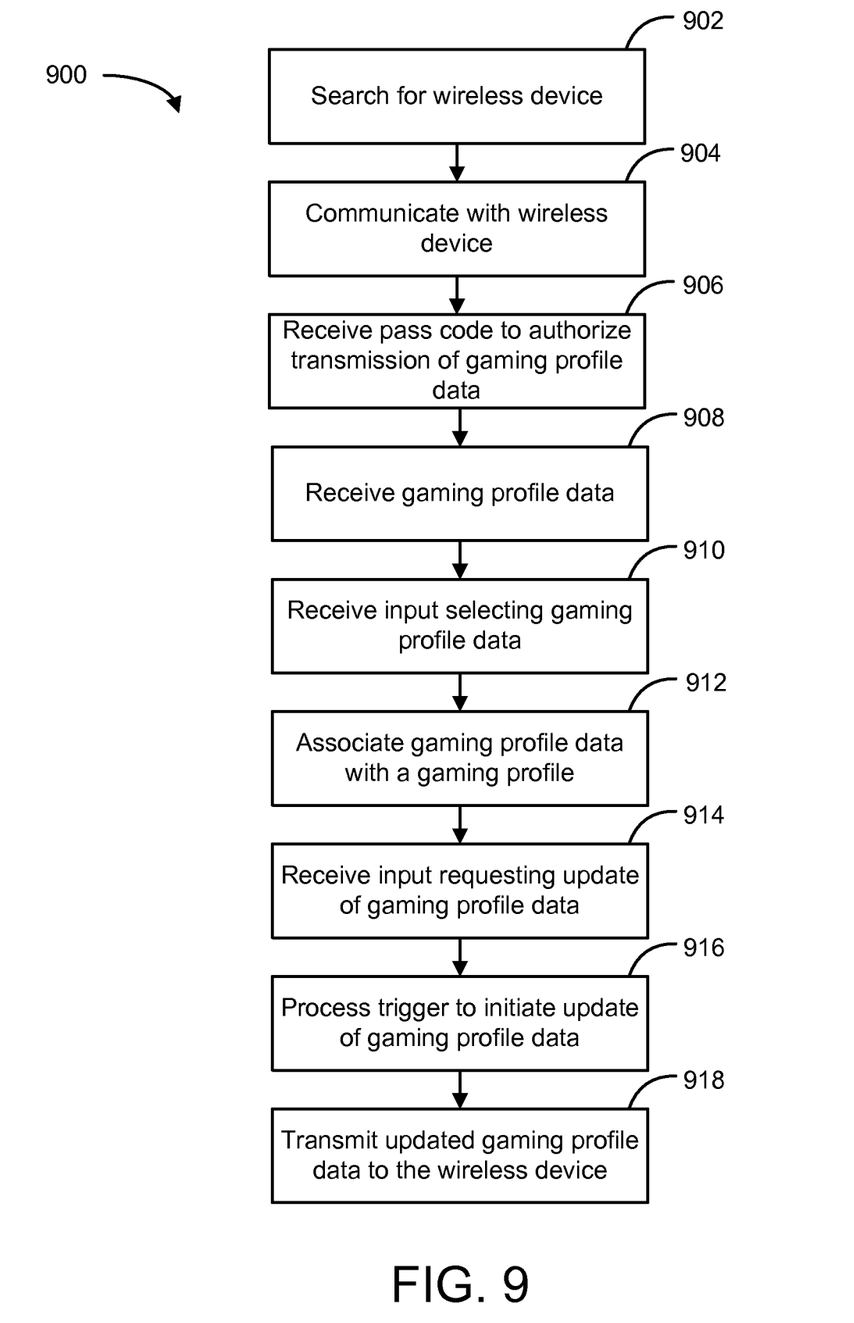
FIG. 9 depicts a flow chart diagram of one embodiment of a method for synchronizing a portable gaming profile with a gaming system.

FIG. 9 depicts a flow chart diagram of one embodiment of a method 900 for synchronizing a portable gaming profile with the gaming system 102. The method 900 is, in certain embodiments, a method of use of the systems and apparatuses of FIGS. 1-8, and is described with reference to those figures. Nevertheless, the method 900 may also be conducted independently thereof and is not intended to be limited to the specific embodiments discussed above with respect to those figures.

As shown in FIG. 9, the gaming system 102 searches 902 for a wireless device 104. The gaming system 102 may search 902 for a wireless device 104 continuously. In an alternative embodiment, the gaming system 102 searches for the wireless device 104 in response to an input.

The gaming system 102 communicates 904 with the wireless device 104, in one embodiment. In certain embodiments, the gaming system 102 communicates 904 with the wireless device 104 using a transceiver 302. The transceiver 302 may be located at the gaming system 102. In an alternative embodiment, the transceiver 302 is located at a gaming controller 106. In still another embodiment, the transceiver 302 is located at one of the signal sensors 602, 604.

Communicating 904 with a wireless device 104 may include the transmission of identification data of the gaming system 102 and/or identification data of the wireless device 104. In certain embodiments, a pass code is used to authorize the transmission of gaming profile data 802. In one embodiment, the gaming system 102 receives 906 a pass code to authorize transmission of the gaming profile data 802. In an alternative embodiment, the wireless device 104 receives 906 a pass code to authorize transmission of the gaming profile data 802.

In one embodiment, the gaming system 102 receives 908 the gaming profile data 802 from the wireless device 104. In one embodiment, the gaming profile data 802 includes a key 806. In an alternative embodiment, the gaming profile data 802 includes one or more of user settings 810, game settings 814, and saved games 818.

In some embodiments, the gaming system 102 receives 910 input to select gaming profile data. For example, the gaming system 102 may detect a plurality of wireless devices 102. In this example, the gaming system 102 may present a list of available gaming profiles that correspond to the detected wireless devices and receive an input from the user selecting among these gaming profiles.

In some embodiments, the gaming system 102 associates 912 the gaming profile data 802 with a gaming profile 804. The association 912 of the gaming profile data 802 with the gaming profile 804 may include saving elements of the gaming profile data 802 in the gaming profile 804. For example, the gaming profile data 802 may include game settings 814 that are saved into the gaming profile 804 as game settings 816.

The gaming system 102 receives 914 an input requesting an update of gaming profile data 802. The received 914 input may be an explicit request to update the gaming profile data 802. For example, a user operating a gaming system 102 may initiate a transport of a gaming profile 804 to a friend's gaming system. The user, in this example, may select a menu option that saves gaming profile data 802 on the wireless device 104.

In some embodiments, the gaming system 102 processes 916 a trigger to initiate the update of the gaming profile data 802. The trigger, in certain embodiments, includes reaching a milestone within a game. In an alternative embodiment, the trigger may be the passage of a preset value of time. In yet another embodiment, the trigger may be exiting a game.

The gaming system 102 transmits 918 updated gaming profile data 802 to the wireless device 104, in certain embodiments. The transmission 918 of the updated gaming profile data 802 may be in response to processing 916 a trigger and/or receiving 914 an input requesting an update of the gaming profile data 802. In some embodiments, the gaming system 102 wirelessly transmits 918 the updated gaming profile data 802 to the wireless device 104 using a transceiver 302.

Figure 10:
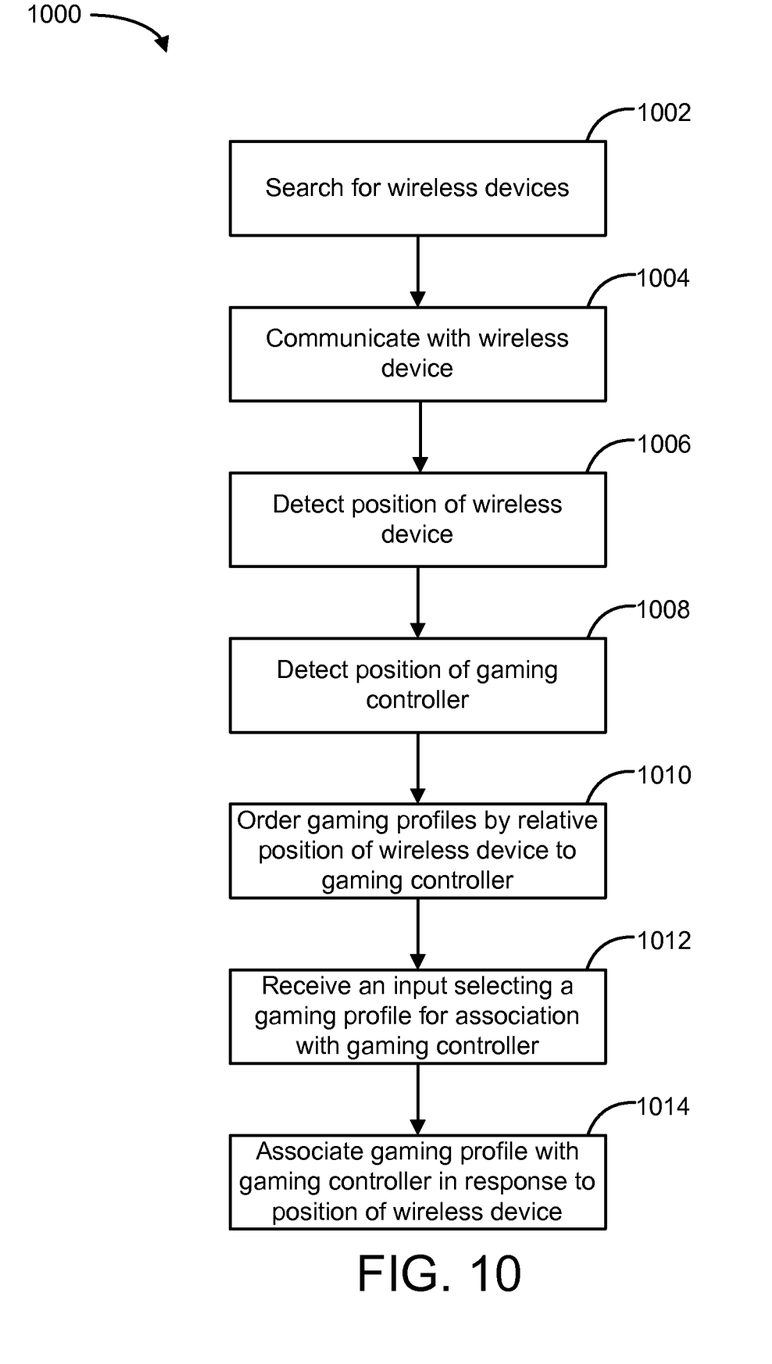
FIG. 10 depicts a flow chart diagram of one embodiment of a method for selecting a gaming profile based on the position of a wireless device.

FIG. 10 depicts a flow chart diagram of one embodiment of a method 1000 for selecting a gaming profile 804 based on a position of a wireless device 106. The method 1000 is, in certain embodiments, a method of use of the systems and apparatuses of FIGS. 1-8, and is described with reference to those figures. Nevertheless, the method 1000 may also be conducted independently thereof and is not intended to be limited to the specific embodiments discussed above with respect to those figures.

As shown in FIG. 10, the gaming system 102 searches 1002 for a wireless device 104. The gaming system 102 may search 1002 for the wireless device 104 continuously. In an alternative embodiment, the gaming system 102 searches 1002 for the wireless device 104 in response to an input.

The gaming system 102 communicates 1004 with the wireless device 104 in one embodiment. In certain embodiments, the gaming system 102 communicates 1004 with the wireless device 104 using a transceiver 302. The transceiver 302 may be located at the gaming system 102. In an alternative embodiment, the transceiver 302 is located at a gaming controller 106. In still another embodiment, the transceiver 302 is located at one of the signal sensors 602, 604. Communicating 1004 with a wireless device 104 may include the transmission of identification data of the wireless device 104.

In certain embodiments, the gaming system 102 detects 1006 the position of the wireless device 104. The gaming system 102, in one embodiment, detects 1006 the position of the wireless device 104 by determining a signal strength of the signal from the wireless device 104 at various positions. In another embodiment, the gaming system 102 detects 1006 the position of the wireless device 104 by determining a signal direction of a signal from the wireless device 104 from various positions. In yet another embodiment, the position of the wireless device is detected 1006 using a global navigation satellite system receiver 408.

In some embodiments, the gaming system 102 detects 1008 a position of a gaming controller 106. The position of the gaming controller 106 may be detected 1008 using the methods described above in relation to detecting 1006 the position of the wireless device 104, including signal strengths, signal directions, and/or absolute position.

In one embodiment, the gaming system 102 creates a list of gaming profiles ordered 1010 by relative position of wireless device 104 to the gaming controller 106. For example, the gaming system 102 may detect 1006 positions of a plurality of wireless devices 104. In this example, the gaming system 102 may create a list of gaming profiles associated with each of the wireless devices 104, the list ordered 1010 by the proximity of each of the plurality of wireless devices 104 to the gaming controller 106. In this example, the gaming profile associated with the wireless device 104 closest to the gaming controller 106 may be at the top of the list.

In certain embodiments, the gaming system 102 receives 1012 an input to select a gaming profile for association with the gaming controller 106. In certain embodiments, the received 1012 input is a selection from a list of gaming profiles ordered 1010 by the gaming system 102 by the proximity of associated wireless devices to the gaming controller 106.

The gaming system 102, in some embodiments, associates 1014 a gaming profile with the gaming controller 106 in response to the position of the wireless device 104. In some embodiments, the gaming system 102 may associate 1014 the gaming profile with the gaming controller 106 without further input from the user. In another embodiment, a gaming system 102 receives 1012 an input to select a gaming profile which is then associated 1014 with the gaming controller 106.

The various embodiments described herein allow a gaming system 102 user to easily transport elements of a game profile between gaming systems by using a wireless device 104. In some embodiments, the gaming system 102 detects a position of the wireless device 104 to facilitate association of the gaming profile with a gaming controller 106.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations to select a gaming profile based on a position of a wireless device relative to a gaming controller. In one embodiment, the operations include an operation to communicate with the wireless device associated with the gaming profile of a gaming system. The wireless device is a device other than the gaming controller. The operations also include an operation to detect a position of the wireless device. The operations also include an operation to identify the gaming profile for association with the gaming controller in response to the position of the wireless device. Other embodiments of the computer program product may implement fewer or more instructions according to the functionality described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
the computer program product comprising a non-transitory computer useable storage medium to store a computer readable program, wherein the computer readable program, when executed on a computer, causes the computer to perform operations for selecting first and second gaming profiles at a video gaming console of a gaming system based on a position of first and second wireless devices relative to a position of first and second gaming controllers, wherein the gaming controllers are handheld electronic devices to provide user input to the video gaming console, the operations comprising:
communicate with the first wireless device associated with the first gaming profile of the gaming system, wherein the first wireless device is a separate device from the first and second gaming controllers;
communicating with the second wireless device associated with the second gaming profile of the gaming system, wherein the second wireless device is a separate device from the first and second gaming controllers;
detect a position of the first wireless device and the second wireless device;
detect a position of the first gaming controller and the second gaming controller; and
identify the first gaming profile for accessing with the first gaming controller at the video gaming console and the second gaming profile for accessing with the second gaming controller at the video gaming console in response to the position of each of the first and second wireless devices relative to the position of each of the first and second gaming controllers.

2. The computer program product of claim 1, wherein the computer readable program, when executed on the computer, causes the computer to perform an operation to determine that the first gaming controller is closer than the second gaming controller to the first wireless device, and to associate the first gaming profile with the first gaming controller based on the determination that the first gaming controller is closer than the second gaming controller to the first wireless device.

3. The computer program product of claim 1, wherein the computer readable program, when executed on the computer, causes the computer to perform an operation to order the first gaming profile and the second gaming profile in response to the position of the first wireless device and the position of the second wireless device relative to the first wireless device.

4. The computer program product of claim 3, wherein the computer readable program, when executed on the computer, causes the computer to perform an operation to display a list of gaming profiles for selection, the list of gaming profiles comprising the first gaming profile and the second gaming profile ordered in response to the position of the first wireless device and the position of the second wireless device relative to the first wireless device.

5. The computer program product of claim 1, wherein the computer readable program, when executed on the computer, causes the computer to perform an operation to associate the first gaming profile with a view pane in response to the position of the first wireless device relative to the video gaming console of the gaming system.

6. The computer program product of claim 1, wherein the first wireless device comprises a mobile phone.

7. The computer program product of claim 1, wherein the first wireless device comprises a radio frequency identification (RFID).

8. A system for selecting first and second gaming profiles based on a position of first and second mobile phones, the system comprising:
   a position detector configured to:
      detect a position of each of a plurality of gaming controllers
      detect a position of the first mobile phone relative to the position of each of the plurality of gaming controllers, wherein the first gaming profile for a gaming system is associated with the first mobile phone; and
      detect a position of the second mobile phone relative to the position of each of the plurality of gaming controllers, wherein the second gaming profile for the gaming system is associated with the second mobile phone, wherein the gaming controllers are handheld electronic devices to provide user input to a video gaming console of the gaming system; and
   a gaming profile manager to associate the first gaming profile with one of the gaming controllers in response to the position of the first wireless device relative to the position of each of the plurality of gaming controllers and the second gaming profile with a different one of the gaming controllers in response to the position of the second wireless device relative to the position of each of the plurality of gaming controllers.

9. The system of claim 8, further comprising a radio frequency transceiver configured to communicate with the first and second mobile phones.

10. The system of claim 8, further comprising an optical transceiver configured to communicate with the first and second mobile phones.

11. The system of claim 8, wherein the position detector is further configured to receive an absolute location of the first and second mobile phones from the first and second mobile phones.

12. A method for selecting first and second gaming profiles based on a position of first and second wireless devices relative to first and second gaming controllers, the method comprising:
   communicating with the first wireless device associated with the first gaming profile of a gaming system and with the second wireless device associated with the second gaming profile of the gaming system, wherein the first and second wireless devices are separate devices from the first and second gaming controllers, wherein the gaming controllers are handheld electronic devices to provide user input to a video gaming console of a gaming system;
   detecting a position of each of the first and second gaming controllers;
   detecting a position of each of the first and second wireless devices relative to the position of each of the first and second gaming controllers; and
   associating the first gaming profile with the first gaming controller and the second gaming profile with the second gaming controller in response to the position of each of the first and second wireless devices relative to the position of each of the first and second gaming controllers.

13. The method of claim 12, wherein detecting the position of the first wireless device further comprises:
   receiving at the first gaming controller a signal from the first wireless device; and
   measuring a signal strength of the signal received from the first wireless device at the first gaming controller.

14. The method of claim 13, further comprising:
   receiving at the first gaming controller a second signal from the second wireless device, the second wireless device associated with the second gaming profile;
   measuring a second signal strength of the second signal at the first gaming controller;
   comparing the signal strength with the second signal strength to determine a wireless device with a higher signal strength;
   associating the first gaming profile, which is associated with the wireless device with the higher signal strength, with the first gaming controller.

15. The method of claim 12, wherein detecting the position of the first wireless device further comprises:
   sensing a signal from the first wireless device at a first signal sensor;
   sensing a signal from the first wireless device at a second signal sensor; and
   comparing the sensed signal at the first signal sensor to the sensed signal at the second signal sensor to determine the position of the first wireless device.

16. An apparatus for selecting first and second gaming profiles based on a position of each of first and second wireless devices relative to first and second gaming controllers, the apparatus comprising:
   a transceiver configured to:
      communicate with a first mobile phone and to receive gaming profile data from the first mobile phone, the first mobile phone associated with the first gaming profile for a gaming system; and
      communicate with a second mobile phone and to receive gaming profile data from the second mobile phone, the second mobile phone associated with the second gaming profile for the gaming system;
   a position detector coupled to the transceiver, the position detector configured to detect a position of each of the first and second mobile phones and a position of each of the first and second gaming controllers; and
   a gaming profile manager coupled to the position detector, the gaming profile manager to associate the first gaming profile with the first gaming controller in response to the position of the first mobile phone relative to the position of the first gaming controller and the second gaming profile with the second gaming controller in response to the position of the second mobile phone relative to the position of the second gaming controller, wherein the first and second gaming controllers are handheld electronic devices to provide user input to a video gaming console of the gaming system, wherein the first and second wireless devices are separate devices from the first and second gaming controllers.

* * * * *